Figure 1A:
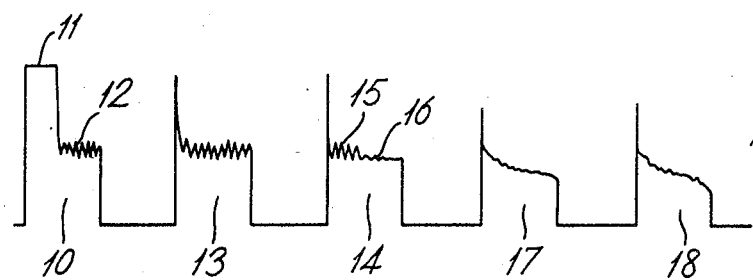

United States Patent [19]

Fowell et al.

[11] 4,322,595
[45] Mar. 30, 1982

[54] ARC MONITOR FOR ELECTRICAL DISCHARGE MACHINING

[75] Inventors: Alan Fowell, Mossley; Trevor W. Shaw, Cranfield; John R. Crookall, Harrold, all of England

[73] Assignee: National Research Development Corporation, London, England

[21] Appl. No.: 173,355

[22] Filed: Jul. 29, 1980

[51] Int. Cl.³ .............................................. B23P 1/02
[52] U.S. Cl. ................................. 219/69 C; 219/69 S
[58] Field of Search ............................ 219/69 C, 69 S

[56] References Cited

U.S. PATENT DOCUMENTS

| | | |
|---|---|---|
| 3,624,337 | 11/1971 | Kauffman . |
| 3,662,143 | 5/1972 | Davis . |
| 3,705,286 | 12/1972 | Kondo et al. ............... 219/69 C |
| 3,746,930 | 7/1973 | Van Best et al. ........... 219/69 S |
| 4,009,361 | 2/1977 | Stanton et al. ............. 219/69 C |

FOREIGN PATENT DOCUMENTS

| | | |
|---|---|---|
| 2027732 | 10/1970 | France . |
| 2099228 | 3/1972 | France . |
| 2252900 | 6/1975 | France . |
| 1323968 | 7/1973 | United Kingdom . |
| 1330418 | 9/1973 | United Kingdom . |
| 1334600 | 10/1973 | United Kingdom . |
| 1492027 | 11/1977 | United Kingdom . |
| 1494992 | 12/1977 | United Kingdom . |
| WO79/00379 | 6/1979 | PCT Int'l Appl. . |

OTHER PUBLICATIONS

"Monitoring and Controlling the EDM Process" Bhattacharyya et al., Transactions ASME, Paper No. 79--WA/PROD-2, Dec. 1979.

Primary Examiner—G. C. Shaw
Attorney, Agent, or Firm—Cushman, Darby & Cushman

[57] ABSTRACT

Apparatus for monitoring EDM is described in which the voltage across the gap between an electrode and a workpiece is passed through a filter which selects those frequencies which are present only during sparking across the gap. The voltage across the gap is also applied to a comparator which detects discharge across the gap by determining whether the gap voltage is between two levels. The proportion of discharge time in which arcs occur is derived by a time-divider circuit which receives signals after processing from the filter and the comparator.

14 Claims, 8 Drawing Figures

ARC MONITOR FOR ELECTRICAL DISCHARGE MACHINING

The present invention relates to a monitor for electrical discharge machining (EDM) and particularly for indicating the fraction of discharge time in EDM in which arcs, as opposed to sparks, occur. EDM is also known as spark erosion machining.

In EDM, voltage pulses are applied between a shaped electrode and a workpiece spaced from the electrode, the gap between the electrode and the workpiece being positioned in a dielectric fluid. The resulting discharge erodes the workpiece to form a shape which depends upon the shape of the electrode. For good machining the discharge should be in the form of a series of sparks during each applied voltage pulse but the sparks often degenerate into arcs which instead of removing material from the workpiece burn the workpiece and the electrode. As a result both the electrode and the workpiece may become deformed by excessive burning, and excessive stresses are set up in the workpiece which may well affect its future performance, as for example in a mould for metal or plastic die casting, or in a press-tool die.

When an operator is using an EDM machine he needs to minimise the occurrence of arcs for the reasons given above but, at present, he does not know when arcs are occurring and he operates his machine by using characteristics supplied by the manufacturers which tend to set the machine in a way which prevents a seriously high number of arcs occurring. However by following these characteristics, optimum machining in terms of metal removal time for carrying out a machining operation, and workpiece finish, are not necessarily achieved.

In EDM an arc is regarded as the undesirable condition in the spark gap when the current flows through a low impedance conductive path, and a spark is regarded as the desirable form of discharge for EDM. Sparking is characterised by repeated application of relatively high voltage between the electrode and workpiece, subsequent electrical breakdown of the dielectric in the gap, current flow through the ionised channel, and, following switch off of the current, recovery of the dielectric fluid to its electrically insulating state.

According to the present invention there is provided apparatus for monitoring electrical discharge machining, comprising a filter having a cut-off frequency in the range 1 MHz to 4 MHz and passing signals in at least a band of frequencies above the cut-off frequency, the filter input being adapted to receive signals representative of the voltage across the discharge gap of an electrical discharge machine, spark-indication means for generating a spark-indicating signal by determining when the output signal of the filter exceeds a reference level, and discharge-detection means, adapted to receive signals representative of the said voltage across the gap, for generating a discharge-indication signal while a discharge occurs.

The spark-indicating signal and, in some applications, the discharge indication signal may be passed to other apparatus and processed in a variety of ways for presentation, for example, to an EDM machine operator to allow him to achieve near optimum machining conditions. For example the proportion of machining time in which sparking occurs can be derived.

For determining the proportion of discharge time in which arcs occur apparatus according to the invention may include analysis means for deriving from the spark-indication signal and the discharge-indication signal a signal representative of the required proportion.

Preferably the filter has a cut-off frequency in the range 1.5 MHz to 3 MHz since although cut-off frequencies in the range 1 MHz to 4 MHz can result in apparatus providing a useful output, better monitoring with less stringent filter attenuation characteristics are obtained if the cut-off frequency is in the narrower range.

An advantage of the apparatus according to the invention incorporating the analysis means is that an EDM machine operator using the apparatus is able to see immediately the proportion of discharge time in which arcing occurs, and adjust his machine accordingly. Similarly in adaptive machining the output from the apparatus may be used to signal a change in operating parameters.

The apparatus according to the invention depends on the occurrence during sparking of signals at a relatively high frequency compared with signals due to the application of the machining pulses to the gap, which are present during arcing and sparking.

The present inventors have found from experimental tests that these signals have usefully high amplitudes in the frequency range from approximately 1 MHz to 7 to 8 MHz, (depending on machining parameters) being components of the voltage across the gap. While such signals do occur during arcing, their amplitude is only above the reference level when sparking occurs.

The function of the filter in apparatus according to the invention is to remove from the gap voltage, signals due to the machining pulses applied across the gap. The repetition frequency of these pulses might be as high as 250 KHz. It has been established by experiment that a filter with a low-frequency cut-off of 1.5 to 3 MHz provides the best compromise between passing high frequency components associated with the discharge, and attenuating high frequency components associated with the switching of the voltage applied to the spark gap. The filter may be a high-pass filter having a decreasing response from about 4 MHz upwards since the frequency components due to sparking and arcing begin to fall to an insigificant amplitude above about 4 MHz, or a wide band-pass filter may be used having a bandwidth of at least 3 MHz.

However, even if the low frequency cut-off of the filter is at a rate of, for example, 36 decibels per octave, this is not adequate to prevent high amplitude of some frequency components in the pulse edges from being transmitted through the filter. Preferably therefore the apparatus according to the invention is constructed, as is described below, to prevent these components from affecting the signal which is representative of the required proportion.

As indicated above, the amplitude of signals is significantly different for arcing and sparking in the range 1 MHz to 7 or 8 MHz, and for this reason it might be thought that a narrow band-pass filter, having a bandwidth of for example, only 100 KHz, would be preferable to a high-pass or wide band-pass filter. However, when a narrow band-pass filter is used, it is found that the output signal from the filter is modulated during machining pulses, so that even while sparking occurs throughout the whole of such a pulse, the output from the narrow band-pass filter varies cyclically. This variation is thought to be due to the change in frequency spectrum which occurs while sparking persists. If apparatus according to the invention is to determine for each machining pulse (that is on a "per pulse" basis) whether arcing is occurring, then in order to compare the output from the filter with a fixed reference level, a constant output from the filter during sparking is required. The present inventors have found that such an output is obtained from a high-pass filter or a wide band-pass filter, but not from a narrow band-pass filter, and the use of a high-pass filter or a wide band-pass filter is an important feature of the present invention. To summarise, the important features of the filter design in the present invention are the establishment of the requirement of a low frequency cut-off in the range 1.5 MHz to 3 MHz below which signals are severely attenuated, and the unimportance of any high frequency cut-off of the filter.

In measurement applications or in adaptive machining it is an advantage, and is sometimes essential, to be able to determine when sparking degenerates to arcing within a machining pulse, and for this reason the use of a high-pass filter is particularly important since the modulation which occurs on a narrow band-pass filter output may well fall below the reference value even during sparking. In addition the indication given by the apparatus would be erroneous if portions of pulses were indicated as arcs and not sparks. The ability to detect arcing on a "per pulse" basis is thus an important advantage of the invention.

The signal from the machining gap may reach the filter either by way of direct connections to the electrode and the workpiece gap, or by radiation of this signal from the gap which is received and applied to the filter.

The output from the filter consists of a carrier frequency which may assume any value within the passband of the filter, with an amplitude modulation which is representative of the state of machining, i.e. there being a larger output during good discharging than in arcing. The above mentioned reference level defines filter-signal amplitudes which occur only during sparking and exceed this level. The spark indication means may, therefore, advantageously comprise a rectifier, to convert the filter output to a unidirectional signal, and a comparator, which receives a signal representative of the reference level for comparision with the rectifier output signal.

The filter may be an active filter and if so it is not important if the gain elements in the filter saturate at input signal levels corresponding to output signals well above the reference level, and equally it is not of significance if the active filter generates noise, provided such noise is well below the reference level. The active filter design problem is eased therefore, since the dynamic range of the active filter need not be particularly large.

The output of the comparator is zero during arcs but it is dc, chopped at the instantaneous carrier frequency during good discharges. This instantaneous frequency assumes a minimum value of about 1.5 MHz to 3 MHz, i.e. the low frequency cut-off of the active filter. However, for the purposes of the present embodiment, a continuous dc output is required during good discharges. The conventional method of removing the carrier in amplitude demodulation consists of a simple resistance-capacitance filter on the detector output but since the conventional diode capacitor detector has a time constant which is comparatively long compared with the frequencies which it is to detect, such a detector would give an erroneous response to signals from the high-pass filter. A signal which had a comparatively slow rise time and comparatively slow fall time at the beginning and end, respectively, of each machining pulse would then occur at the output of the resistance-capacitance filter. The output of such a detector would therefore be of little use in "per pulse" determination of arcing or of the determination of arcing during machining pulses. For this reason, in one aspect of the invention the spark indication means advantageously comprises a monostable circuit driven by the comparator, the monostable having an astable period just larger than the period of the lowest significant frequency which occurs in the filter output during sparking.

The discharge-detection means may comprise a further comparator circuit having first and second reference levels, the first reference level being below the range of discharge voltage levels, the second reference level being above the range of discharge voltage levels, and the discharge detection means generating the discharge indication signal only when input signals fall between the first and second reference levels. In this specification the discharge is regarded as occurring if the gap voltage is substantially above the gap short-circuit voltage but substantially below the gap open circuit voltage.

The output of the further comparator may then be coupled to a further filter, whose output is substantially a slightly delayed replica of the output of the further comparator. This prevents any output from the monostable which is due to remaining components in the machining pulse leading edge detracting from the arcing period measurements, and is the construction which prevents components of the machining pulses from affecting the signal which is representative of the required proportion.

Since the spark-indication means provides a signal when sparking occurs and an indication of arcing is required, the analysis means preferably includes logic means for deriving a predetermined logic level when arcing occurs. The logic means may comprise gating means which is coupled to receive pulses from the discharge means but is only enabled by the spark indication means when sparking does not occur.

The analysis means may also comprise first and second gates for gating pulses to first and second counter means, respectively, from a clock pulse generator. The first gate is coupled to the said gating means, to be enabled during arcing, and the second gate is coupled to the output of the discharge-detecting means to be enabled while discharges occur. Means for reading out the first counter means are coupled to the second counter means and are operated when the second counter means reaches a predetermined count, the output from the first counter means then being representative of the fraction of discharge time in which arcs occur. The output of the first counter means may be connected to a digital-to-analogue converter, and thence to an analogue indication circuit including a meter.

Alternatively the analysis means may comprise means for measuring the durations of the spark-indicating signal and the discharge indication signal in an interval, respectively, and means for dividing the former by the latter; or the analysis means may comprise means for measuring the duration of the spark-indicating signal over one or more intervals in which discharges occur, and means for dividing the duration of sparking by the said interval or the total duration of the said intervals.

Figure 2A:
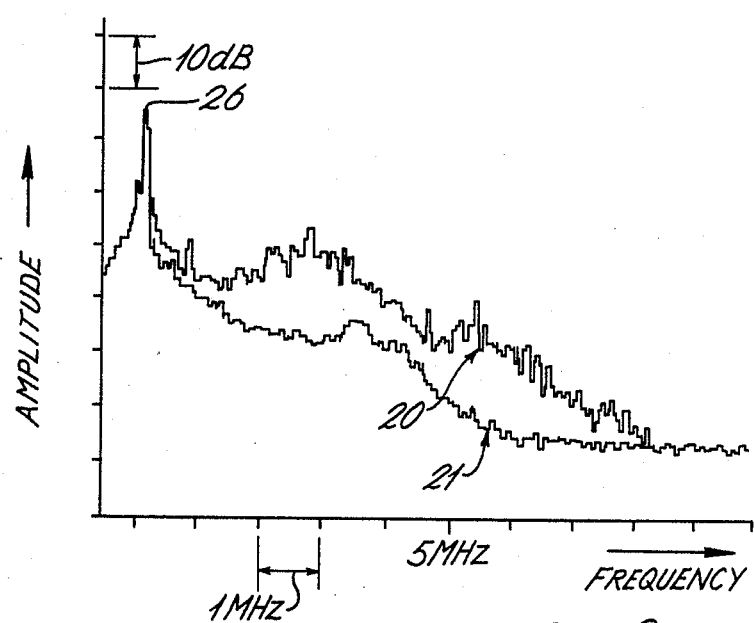
Figure 2B:
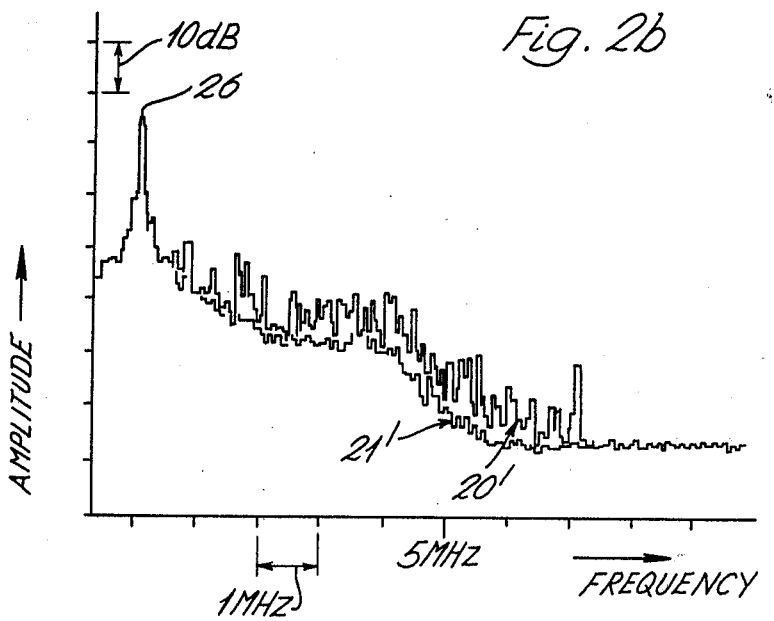
Figure 3:
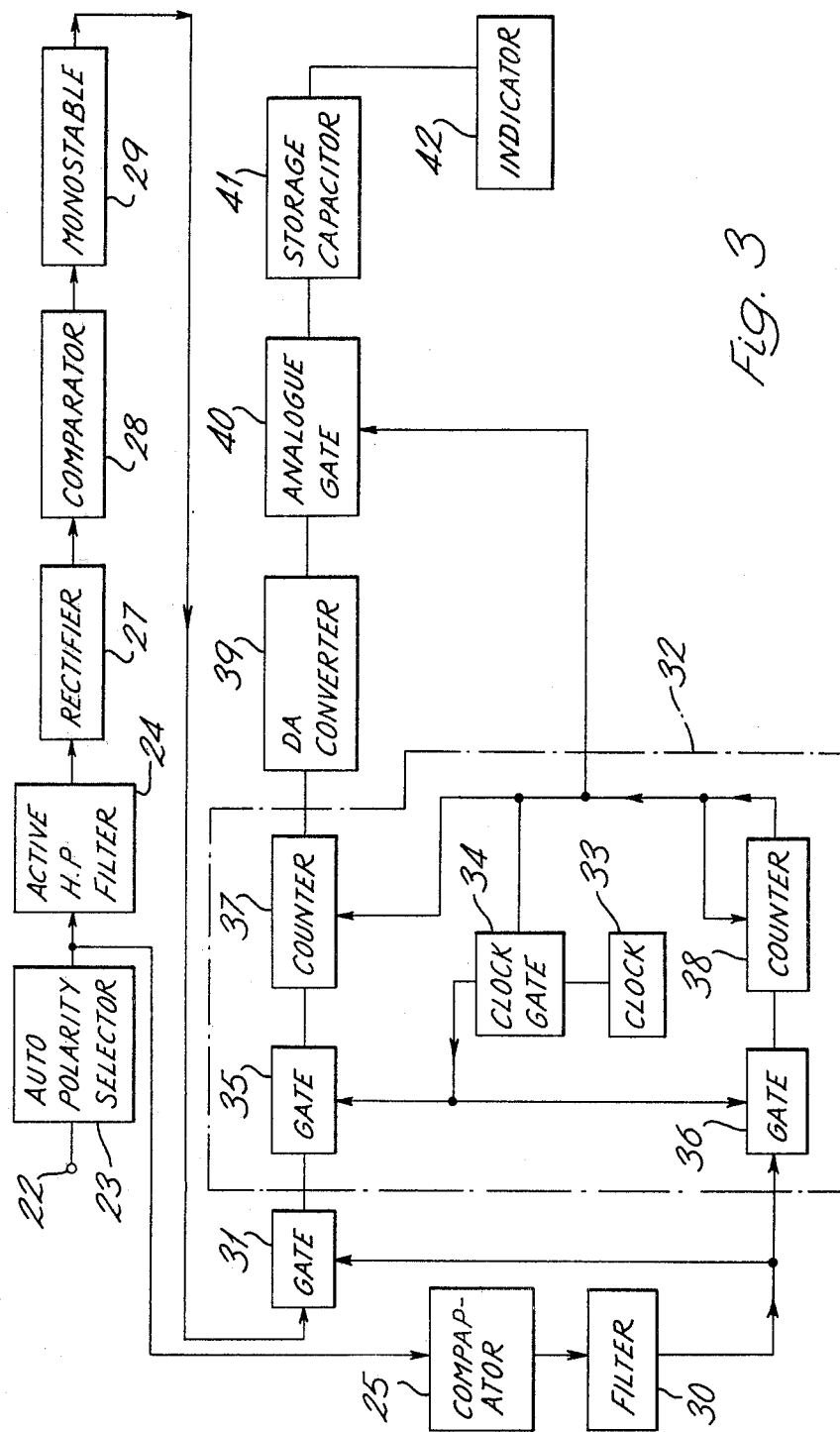

Certain embodiments of the invention will now be described, by way of example, with reference to the accompanying drawings, in which:

FIGS. 1(a) to 1(e) show waveforms useful in explaining the invention,

FIGS. 2(a) and 2(b) show frequency spectra of signals generated in an EDM gap for different pulse conditions, and FIG. 3 is a block diagram of apparatus according to the invention.

The pulses shown in FIG. 1(a) are typical of voltages which occur across the gap between the electrode and workpiece during electrical discharge machining. Each pulse shown corresponds to one machining pulse, pulse 10 commencing with an open circuit portion 11 where there is no discharge across the gap and terminating in a portion 12 where sparking occurs in the gap. When sparking occurs a high freuency signal is imposed on the voltage as shown. This high frequency signal is that mentioned above as indicative of sparking and will be described in more detail later. The second pulse in FIG. 1(a), pulse 13, is a "good" machining pulse which starts with a high voltage leading edge, occurring as the gap breaks down followed by continuous sparking for the rest of the pulse. In pulse 14 a period of sparking 15 follows the high voltage leading edge but then the sparking degenerates to arcing as evidenced by the reduction in amplitude variations at 16. Pulses 17 and 18 show continuous arcing and are useless for machining.

The pulses used in various applications of machining and in the same machining process may cover quite a wide range of current, "on" time and "off" time. For example where only a small amount of material is to be removed by each pulse, for example in a finishing condition, the machining pulses may have a duration of some 50 microseconds and there is an interval of some 20 microseconds between pulses. In this situation the discharge current may for example be 6 amps. At the other end of the range of machining pulses used, for example, in coarse machining, the discharge current might be 400 amps and each machining pulse may last for an interval of 2 milliseconds and may be separated by intervals of 0.4 milliseconds.

FIG. 2(a) shows a typical spectrum for the finishing condition mentioned above while FIG. 2(b) shows the spectrum for the coarse machining condition also given above. The upper curve 20 in FIG. 2(a) indicates the spectrum for sparking while the curve 21 is that for arcing. It will be seen that the difference between the two conditions appears at about 1 MHz and disappears again at about 8 MHz. In FIG. 2(b) the curve 20' indicates the spectrum during sparking while 21' applies to arcing. While there is less difference in the coarse machining condition, the difference is sufficient to allow monitoring to be carried out. Again the difference is first apparent at about 1 MHz but disappears at about 7 MHz.

In FIG. 3, a voltage representative of gap voltage, and provided either by direct connection to the gap or by radiation from the gap is applied to a terminal 22 where it passes by way of an auto-polarity selector 23 before being applied to a high-pass active filter 24 and a comparator 25. Since the voltage applied to the gap can be of either polarity, the auto-polarity selector 23 is included to apply voltage of the same polarity to the filter 24 and the comparator 25 regardless of the polarity of the gap voltage.

Figure 1B:
Figure 1C:
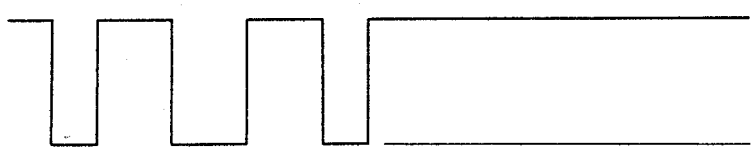

The high-pass filter 24 has a cut-off frequency of 2 MHz since as can be seen from FIGS. 2(a) and 2(b) this cut-off frequency occurs where there is always a significant difference between high frequencies generated during arcing and sparking, and it is sufficiently far from the peak 26 in FIGS. 2(a) and 2(b), which is due to frequency components of the machining pulses. The high-pass filter is of conventional design and the reasons for using such a filter instead of a narrow band-pass filter have already been explained. The output of the high-pass filter 24 is illustrated in FIG. 1(b).

The output of the high-pass filter 24 is connected to a detecting system comprising a rectifier 27, a comparator 28, and a monostable circuit 29. The comparator 28 compares the rectifier output with a reference voltage set to distinguish between signals of sufficient amplitude to indicate sparking and other signals.

The monostable circuit 29 has an astable period of 0.5 microseconds since this period is sufficient to ensure that the monostable circuit 29 remains in its astable state for the duration of bursts of high frequency signals due to sparking (that is gaps within bursts of sparking in the output of the comparator 28 are bridged to determine the envelope of the comparator output signal). The output of the monostable circuit therefore has the waveform shown in FIG. 1(c) for the series of gap voltage pulses shown in FIG. 1(a). This output is positive when sparking is not detected.

Figure 1D:
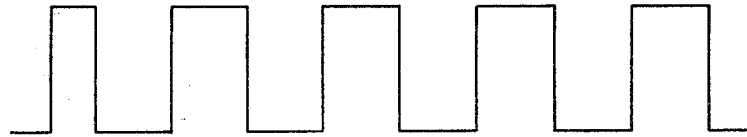
Figure 1E:
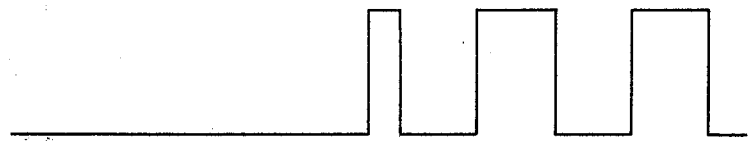

Since it is required to determine the fraction of arcing in discharge intervals, a signal indicating the occurrence of discharges is generated by the comparator 25 and a filter 30. The gap voltage is compared with two voltage levels; one higher than the gap voltage during short circuits and the other lower than the gap voltage during open circuits. Any signal which falls between these two levels is considered as being indicative of a discharge and the output of the filter 30 is shown in FIG. 1(d) with positive levels when discharges occur. For example in pulse 10 a discharge occurs only in the portion 12 and this is also apparent from the first pulse shown in FIG. 1(d). The filter 30 may often be a simple resistance-capacitance filter having an adjustable resistance value. The filter 30 acts substantially as a variable delay element and is so adjusted during continuous arcing that there is no positive output at a gate 31 which is connected to the output of the filter and also receives the output from the monostable circuit 29. The gate 31 provides a positive output when the outputs of the monostable 29 and the filter 30 are both positive as shown in FIG. 1(e). This is an indication of when arcing occurs but alternatively if it is desired to know when sparking occurs the inverse of the waveform of FIG. 1(c) can be gated with the waveform of FIG. 1(d) to provide the required output.

The two signals of FIGS. 1(d) and 1(e) indicate discharge time and arcing time, respectively, and they are applied to a divider means indicated by the dashed line 32. A clock pulse generator 33 applies pulses by way of gate 34 to gates 35 and 36. The gates 35 and 36 are controlled by the outputs of the gate 31 and the filter 30 respectively so that pulses reach the counter 37 only while arcs occur and pulses reach the counter 38 only while discharges occur, and while the clock gate 34 is enabled. The clock pulse generator 33 has a frequency of 5 MHz so that a reasonable number of clock pulses occur during each machining pulse. When the counter 38 reaches a preset value, representing, for example, 52 milliseconds of discharge time, it disables the clock gate 34, and opens an analogue gate 40 to enable the analogue voltage output from a digital-to-analogue converter 39 (representative of the period of time for which arcs occur in 52 milliseconds of discharge time) to be held by a storage capacitor 41, and to be displayed on an indicator 42. The counter 38 then closes the analogue gate 40, resets the first and second counter means 37 and 38, and opens clock gate 34. The circuit of FIG. 3 is so adjusted that the indication means 42 reads zero when the discharges are entirely sparks and 100% when all discharges are arcs, and hence the indication given by the indication means is one of arcing time as a percentage of discharge time.

While some ways of putting the invention into effect have been specifically described many other ways are possible. For example different circuits for distinguishing between signals due to arcs and sparks may be used and a different type of detector circuit, instead of the circuits 27, 28 and 29 may be used. In addition a different type of divider circuit to replace the circuit 32 may be used. The digital output from the circuit 32 may be applied to an adaptive control circuit and in this and other applications a digital-to-analogue converter may not be necessary.

We claim:

1. Apparatus for determining the proportion of discharge time in which arcs occur in electrical discharge machining, comprising:
   filter means for receiving signals representative of the voltage across the discharge gap of an electrical discharge machine, and for passing signals in at least a band of frequencies above a cut-off frequency in the range 1 MHz to 4 MHz;
   spark-indication means for generating a spark-indicating signal by determining when the output signal of the filter means exceeds a reference level;
   discharge-detection means for receiving signals representative of the said voltage across the gap and for generating a discharge-indication signal while a discharge occurs; and
   analysis means for deriving from the spark-indication signal and the discharge-indication signal a signal representative of the proportion of discharge time in which arcs occur.

2. Apparatus according to claim 1 wherein the filter means has a cut-off frequency in the range 1.5 MHz to 3 MHz.

3. Apparatus according to claim 1 wherein the filter means is a high-pass filter having increasing attenuation above 4 MHz.

4. Apparatus according to claim 1 wherein the filter means is a wide band-pass filter having a pass band of at least 3 MHz.

5. Apparatus according to claim 1 wherein the spark-indication means includes a rectifier, for converting the filter output to a unidirectional signal, and a comparator connected to receive a signal representative of the reference level for comparison with the rectifier output signal.

6. Apparatus according to claim 5 wherein the spark indication means includes a monostable circuit coupled to the comparator output, the monostable circuit having an astable period just larger than the period of the lowest significant frequency which occurs in the filter output during sparking.

7. Apparatus according to claim 1 wherein the discharge-detection means comprises a further comparator circuit having first and second reference levels, the first reference level being below the range of discharge voltage levels, the second reference level being above the range of discharge voltage levels, and the discharge detection means generating the discharge indication signal only when input signals thereto fall between the first and second reference levels.

8. Apparatus according to claim 7 wherein the output of the comparator is coupled to a further filter whose output signal is a slightly delayed replica of the output signal of the further comparator.

9. Apparatus according to claim 1 wherein the analysis means includes logic means for deriving a predetermined logic level when arcing occurs.

10. Apparatus according to claim 9 wherein the logic means comprises gating means which is coupled to receive discharge indication signals from the discharge detection means but is only enabled by the spark indication means when sparking does not occur.

11. Apparatus according to claim 10 wherein the analysis means includes first and second gates for gating pulses to first and second counter means, respectively, from a clock pulse generator, the first gate being coupled to the said gating means, to be enabled during arcing, and the second gate being coupled to the output of the discharge-detecting means to be enabled while discharges occur, and means for reading out the first counter means coupled to the second counter means for operation when the second counter means reaches a predetermined count, the output from the first counter means then being representative of the fraction of discharge time in which arcs occur.

12. Apparatus according to claim 11 wherein the output of the first counter means is coupled to analogue indicator means by way of a digital-to-analogue converter.

13. Apparatus according to claim 1 wherein the analysis means comprises means for measuring the durations of the spark-indicating signal and the discharge indication signal in an interval, respectively, and means for dividing the former by the latter.

14. Apparatus according to claim 1 wherein the analysis means comprises means for measuring the duration of the spark indicating signal over at least one interval in which discharge occurs, and means for dividing the duration of sparking by the total duration of the interval or intervals over which the duration of the spark indicating signal was measured.

* * * * *